United States Patent
Onizuka et al.

[11] Patent Number: 5,966,065
[45] Date of Patent: Oct. 12, 1999

[54] CORE FOR INDUCTANCE ELEMENTS AND ITS PRODUCTION METHOD

[75] Inventors: Masahiro Onizuka; Koh Itoh; Sei Kakinuma, all of Akita, Japan

[73] Assignee: TDK Corporation, Tokyo, Japan

[21] Appl. No.: 08/879,187

[22] Filed: Jun. 20, 1997

[30] Foreign Application Priority Data

Jun. 27, 1996 [JP] Japan ..................... 8-168040

[51] Int. Cl.$^6$ ............. C01G 49/08; H01F 27/28
[52] U.S. Cl. ...................... 336/233; 252/62.56
[58] Field of Search .............. 336/233; 252/62.56

[56] References Cited

U.S. PATENT DOCUMENTS

| | | | |
|---|---|---|---|
| 3,931,642 | 1/1976 | Kugimiya et al. | 360/127 |
| 4,732,738 | 3/1988 | Nakataki et al. | 422/94 |
| 4,764,429 | 8/1988 | Mair | 428/403 |
| 5,062,197 | 11/1991 | Charles | 336/233 |
| 5,262,363 | 11/1993 | Yoshida et al. | 501/17 |
| 5,688,430 | 11/1997 | Matsuzaki et al. | 252/62.62 |

FOREIGN PATENT DOCUMENTS 7-24242  3/1995  Japan .

OTHER PUBLICATIONS

Yamamoto et al, Some properties of anisotropic alsium–lanthanum–sodium system ferrite magnets,Meiji Daigaku Kagaku Gijutsu Kenkyusho Kiyo 1982, vol. Date 1981.

*Primary Examiner*—Michael L. Gellner
*Assistant Examiner*—Anh Mai
*Attorney, Agent, or Firm*—Oblon, Spivak, McClelland, Maier & Neustadt, P.C.

[57] ABSTRACT

A core for inductance elements is formed of a sintered body of α-ferric oxide. The core has a flexural strength of at least 6 kgf/mm$^2$ as measured by a three-point bending method, a specific resistance of at least $10^6$ Ω·cm, a Vickers hardness of 800 to 1,500, and an iron content of 75 to 99.9 wt %, calculated as $Fe_2O_3$. The core is produced by granulating, and forming a ferric iron powder, and holding a formed body for sintering at 950 to 1,500° C. for 5 min. to 5 hours in an atmospheric environment.

20 Claims, 4 Drawing Sheets

* WHEN ALUMINA MATERIAL IS USED FOR CORE MATERIAL, SOME STEPS INCLUSIVE OF CALCINATION, AND PULVERIZATION STEPS MAY OFTEN BE DISPENSED WITH.

CORE FOR INDUCTANCE ELEMENTS AND ITS PRODUCTION METHOD

TECHNICAL FIELD

The present invention relates to a core for inductance elements such as coils or transformers, which comprises ferric oxide, and its production method.

BACKGROUND

Recent size, and weight reductions of various types of electronic equipment have accelerated to diminish the size, and weight of electronic parts of which they are made up. This is also true of coils, transformers or the like, and so their size, and weight are now reduced. To reduce the size, and weight of electronic equipment on the one hand, and to enable the equipment to be used at higher frequencies on the other hand, coils or other inductance elements are designed to be used at higher frequencies. In drastically popularized mobile communication fields in particular, coils are now used at a frequency band of 100 MHz or higher.

Magnetic materials, and non-magnetic materials are available for inductance elements, and spinel ferrites are used for the magnetic materials while dielectric ceramics such as alumina, and glasses are used for the non-magnetic materials. In particular, the spinel ferrites have permeability due to their cubic crystal structure, and so are advantageous over air-core coils or inductance elements built up of non-magnetic materials because the number of turns can be decreased with an increased inductance. For this reason, various inductance elements inclusive of coils, and transformers, for the most part, are made up of spinel ferrites.

However, the permeability of spinel ferrites has close relations to frequency, and has a characteristic feature of decreasing sharply from a certain frequency. Thus, their inductance, too, drops at a band exceeding that frequency. Here note that the relation "Snoek's limit line" exists between the permeability of ferrites and frequency. In other words, if a ferrite of low permeability is used to extend permeability to a high frequency region, it can then be used as an inductor for high frequency purposes. Ni-based spinel ferrite material having relatively low permeability is used for such an inductor for high frequency purposes. To make an inductor element for high frequency purposes in particular, Ni-based spinel ferrite material having a permeability as low as about 1 to 3 is used, as set forth in JP-B-7-24242. In this case, a ferrite with its Curie point lower than a practically usable temperature is typically used as material having a permeability of 1.

A spinel ferrite, because of being a solid solution of $Fe_2O_3$ and an oxide with a divalent metal ion, is produced by mixing $Fe_2O_3$ powders with powders of the oxide with a divalent metal ion, and firing the mixture. As the divalent metal ion for Ni systems, Cu, Zn, etc. are used in addition to Ni. However, oxides of Ni, Cu, etc. are expensive, ending up with an increase in the cost of ferrite. A particularly grave problem with such ferrite is that its high frequency characteristics are insufficient, and its Q value is low at 200 MHz or higher as well.

Besides ferrites, alumina, glasses, and resins are primarily available as materials for high frequency inductance elements. However, these materials offer the following problems.

Alumina or a substance having the chemical formula $Al_2O_3$ excels in various properties such as heat resistance, resistance to thermal shock, chemical resistance, wear resistance, electrical insulating properties, hardness, and mechanical strength, and so find applications in wide fields inclusive of substrates, grinding chips, crucibles, and building materials, to say nothing of inductance elements. This alumina has also the properties required for core materials for coils used even in a high frequency region, i.e., low permeability and high electrical resistance. For this reason, the alumina is employed as core material used in a high frequency region, as set forth in JU-A-5-7211. However, the temperature at which pure (high-purity) raw material powders are sintered is very high (about 1,800° C.), posing a problem in connection with the durability of equipment, etc. Consider here that sintering is carried out at 1,200° C. or higher with the addition of $SiO_2$, CaO, MgO, etc. Then, an additional step of blending these components is needed. Furthermore, the high hardness of alumina poses some problems; for instance, it wears away the production equipment used for such blending, e.g., media, and gives rise to contamination due to debris resulting from the wear of such media, and equipment. This wear problem also holds for other equipment, for instance, molds and punches in molding equipment, and causes the overall durability of a production system to become worse. Especially when cores for inductance elements are produced, molds, etc. are likely to wear away, producing an adverse influence on core products, and so posing a grave production problem. This is because it is preferable for such cores to have collars at both their ends, or take E, F, and irregular forms, rather than simple cylindrical, and columnar forms. In a mass-production system, on the other hand, wire materials are automatically wound on cores. In particular, recent electronic parts are increasingly provided in the form of surface mount devices (SMDs), and are often packaged by means of an automated packaging machine. When an automated winding machine is used to wind a wire material on a core for coil production, however, not only does a portion of contact of a core-fixing jig with the core wear away, but also a portion of contact of the wire material with the core wears away during winding, resulting in defects such as winding failure, short-circuiting, and disconnection. In the automated packaging machine, too, a portion of contact of its chuck (handling area) with cores wears away during part packaging, again posing a similar problem.

A glass is a non-crystalline substance, and refers generally to a silicate glass comprising $SiO_2$ and a metal oxide. Glasses, because of excelling in optical properties, are utilized for not only inductance elements but also window glasses, optical fibers, optical lenses, etc. Typical of glasses used for inductance elements is a borosilicate glass comprising boron oxide ($B_2O_5$) and silicon oxide ($SiO_2$), and obtained by melting a mixture of $B_2O_5$, $SiO_2$ and the like. However, these glasses have fragile mechanical strength in themselves. For this reason, they fail during chucking or the like by an automated packaging machine, and so are practically disabled, resulting in low product yields.

A resin is a substance comprising complicated organic acids, and their derivatives, and now find applications in wide fields. The resin has a characteristic feature of melting, and burning at relatively low temperatures, and so being poor in heat resistance. A problem with using the resin as an element is that difficulty is involved in the direct soldering of the resin onto a substrate. Another problem is that the resin is weaker in mechanical strength than ceramics.

DISCLOSURE OF THE INVENTION

It is therefore an object of the present invention to provide a core material for inductance elements which has electrical properties equivalent to those achieved so far in the art, and practical-enough mechanical strength, and which can be produced at low cost through a more reduced number of steps than required to produce conventional materials, and causes little, if any, damage to production equipment, a core formed of the core material, and a core production method.

The inventors have made studies of materials which have electrical properties equivalent to those of conventional ferrites and alumina, are easy to produce, and cause less damage to equipment, and have consequently found that a sintered body composed mainly of ferric oxide satisfies the requirements mentioned above, thereby accomplishing the present invention. Never until now is the sintered body comprising only ferric oxide as a major component used as a core of non-magnetic material. That is, this sintered body is a novel material.

Thus, the object mentioned above is achieved by the present invention which is defined below as (1) to (7).

(1) A core for an inductance element, which is a sintered body of α-ferric oxide.

(2) The core for an inductance element as recited in (1), which has a flexural strength of at least 6 kgf/mm$^2$ as measured by a three-point bending method.

(3) The core for an inductance element as recited in (1), which has a specific resistance of at least $10^6$ Ω·cm.

(4) The core for an inductance element as recited in (1), which has a Vickers hardness lying in a range of 800 to 1,500.

(5) The core for an inductance element as recited in (1), which has an iron content of 75 to 99.9 wt %, calculated as α-$Fe_2O_3$.

(6) The core for an inductance element as recited in (1), in which the inductance element is a coil or transformer.

(7) A method for producing the core for an inductance element as recited in (1), which comprises granulating, and forming a ferric oxide powder, and holding a formed body for sintering at 950 to 1,500° C. for 5 minutes to 5 hours in an atmospheric environment.

FUNCTION

The sintered core body for inductance elements according to the present invention enables its production process to be cut short. For instance, a spinel ferrite is generally produced by a process comprising a preliminary step of molding a base portion of an inductance element, a blending step of mixing raw material oxides together, a calcination step of forming a spinel ferrite after mixing, a pulverization step of fine grinding a calcined product after calcination, and a granulation step of granulating a powder after pulverization. If, in this case, the blending, and pulverization steps are carried out in a wet manner using a solution such as water, it is then required to perform drying in each step. In using alumina or glass to form an inductance element, too, many steps are again needed to obtain a practical core for a high frequency inductance element. In the case of the core for inductance elements according to the present invention, however, not only can inexpensive $Fe_2O_3$ powders be used as the raw material, but also production cost can be expected to come down because the first step can start from the granulation step so that the blending, calcination, and pulverization steps can be dispensed with.

Furthermore, the hardness of the core of the invention can be more reduced than that of an alumina one within a practically acceptable range, and the durability of production, packaging, or other equipment can be improved. Other properties, i.e., electrical, and mechanical properties of the core of the invention can be made equivalent to, or higher than, those of conventional ferrite materials or alumina. In other words, coils or other inductance elements made using the core material of the invention instead of such conventional materials pose no problem in connection with properties at all.

BEST MODE FOR CARRYING OUT THE INVENTION

Figure 1:
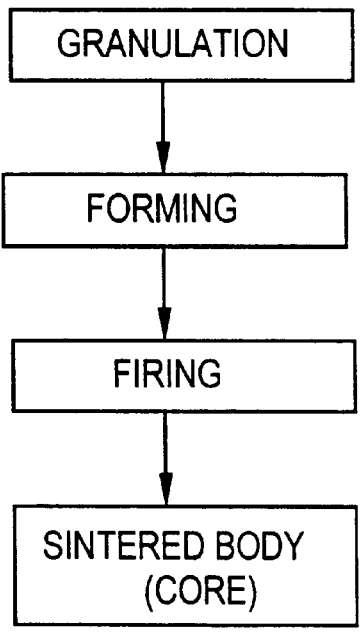
FIG. 1 is a flowchart that illustrates core production methods, with (a) showing a method of producing the non-magnetic material of the invention, and (b) showing a method of producing a conventional core material.
Figure 1:
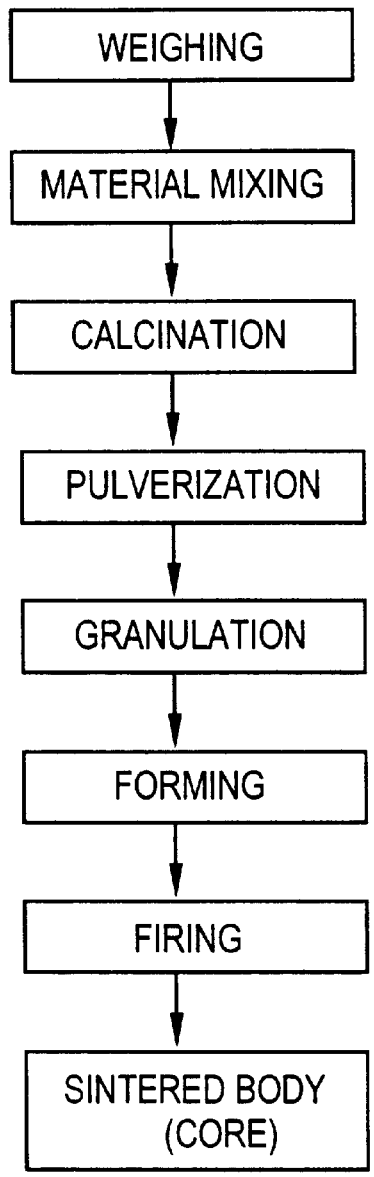

The core for inductance elements according to the present invention is a sintered body of α-ferric oxide. For this reason, the production process can be simplified because some steps including mixing, and pulverization steps can be dispensed with. As will be described later, this sintered body is lower in Vickers hardness than alumina, and has moderate hardness, so that it causes little, if any, damage to equipment. In addition, the sintered body can be produced in high yields. Since the sintered body of the invention is a non-magnetic material, it can be used even in a high frequency region, and can have practical-enough electrical properties as well. Note that ferric oxide occurs in the form of α-$Fe_2O_3$, as can be identified by x-ray diffraction (XRD). The ferric oxide used herein may have been found by XRD to be α-$Fe_2O_3$. However, the whole composition of the ferric oxide may more or less deviate from this stoichiometric composition. Again note that the γ-type is converted into the α-type during firing, and is usually found by XRD to consist only of α-$Fe_2O_3$. In this case, it is preferable that $Fe^{2+}$ occupies 0 to 1 wt %, particularly 0 to 0.5 wt % of the whole of Fe. As the content of $Fe^{2+}$ increases, the specific resistance of the sintered body decreases.

This core material for inductance elements is a sintered body of α-$Fe_2O_3$, which may additionally contain one or two or more of Mg, Ca, Sr, Ba, Al, Si, P, Mn, Co, Ni, Cu, Zn, etc. as inevitable components or impurities. These elements are usually contained in the form of oxides. It is preferable that the core material for inductance elements has an iron content lying within a range of 75 to 99.9 wt %, especially 80 to 99.6 wt %, calculated as $Fe_2O_3$. If the iron content lies within this range, it is then possible to achieve satisfactory properties, and cut down raw material cost.

It is preferable that the content of each impurity or element based on the whole of the core material for inductance elements is 0 to 3 wt %, particularly 0 to 2 wt %, more particularly up to 1 wt %, calculated as each metal. When the contents of these elements exceed the upper limits mentioned above, the magnetic, mechanical, and other properties of the core material become worse. The raw material may further contain, in addition to these elements, up to about 20 ppm of B, up to about 4,000 ppm of Cl, up to about 200 ppm of $Cr_2O_3$, up to about 50 ppm of PbO, up to about 300 ppm of P, up to about 500 ppm of $K_2O$, up to about 1,000 ppm of NaO, up to about 3,000 ppm of $SO_2$, and up to about 20 wt % of $H_2O$.

It is preferable that the sintered core body for inductance elements has a flexural strength of at least 6 kgf/mm$^2$, particularly at least 9 kgf/mm$^2$, more particularly at least 10 kgf/mm$^2$, as measured by a three-point bending method. Although no particular limitation is imposed on the upper limit of flexural strength, the upper limit is usually about 30 kgf/mm$^2$. Lower flexural strength leads to a possibility that the sintered core body may break down due to chucking by an automated packaging machine, for instance, during the production process.

The core material for inductance elements has a specific resistance of at least $10^6$ Ω·cm, particularly at least $10^8$ Ω·cm. Although the upper limit of specific resistance is not critical; it is usually about $10^{13}$ Ω·cm. It is preferable that the specific resistance is high, because the higher the specific resistance, the more reduced the eddy-current loss is. Often, electrodes are formed on a multiturn coil wound directly on a core, and the electrode portion is plated with Ni, Cu, Sn, etc. to increase its reliability. When, in this case, the specific resistance of the core with the coil wound on it is low, not only the electrode portion but also the core base is deposited with the plating metal. If the distance between the electrodes is short, then short-circuiting occurs, resulting in rejects. In addition, an excessive step of plating metal removal is needed. By making plating time short, on the other hand, any deposition of the core base with the plating metal may be avoidable, but the plated thickness of the electrode portion becomes insufficient, leading to a reliability drop. Such phenomena are generally avoidable if the specific resistance is at least $10^6$ Ω·cm.

It is preferable that the core material for inductance elements has a Vickers hardness lying within a range of 800 to 1,500, especially 800 to 1,300. At a Vickers hardness of less than 800, mechanical strength often becomes insufficient. At a Vickers hardness exceeding 1,500, on the contrary, equipment such as media, and a chuck are likely to wear away, and so the overall durability of production equipment, packaging equipment, etc. is likely to drop.

An account will now be given of how to produce the sintered core body according to the present invention.

The sintered core body of the present invention is obtained by granulating, forming, and firing the raw material ferric oxide according to such procedure as illustrated in FIG. 1($a$). On the other hand, a conventional high frequency core, for instance, an alumina, glass, or ferrite core is obtained by weighing, mixing, calcining, pulverizing, forming, and firing the raw material according to such procedure as in FIG. 1($b$). However, when an alumina material is used for the raw material, the calcination, and pulverization steps are often dispensed with. Note that when alumina is used with no additive mixed with it, the weighing, mixing, calcining, and pulverizing steps may in some cases be dispensed with, but this is practically unacceptable because the firing temperature becomes extremely high. Also note that the core may be fired after forming and machining or, in the alternative, it may be machined after forming and firing. A drying step is needed for wet-mixing, and wet-pulverization, respectively. That is, when a nickel-based spinel ferrite is used as the core material, the raw material (e.g., ferric oxide, and nickel oxide) is weighed, mixed, and calcined to form a ferrite. Then, the ferrite is pulverized, granulated, formed, and fired to obtain a core. When an alumina-based material is used as the raw material, on the other hand, it is required to add a sintering aid thereto. Likewise, the raw material is generally then weighed, mixed, granulated, formed, and fired to obtain a core. Even when glass that is insufficient in terms of strength as mentioned above is used as the core material, steps of weighing, mixing, calcining (melting), pulverizing, forming, and firing the raw glass material are needed. Thus, the core for inductance elements according to the present invention can be produced by an extremely simplified production process without recourse to the weighing, mixing, calcining, and pulverizing steps, or the weighing, and mixing steps needed for conventional processes for producing cores for inductance elements.

Then, each production step will now be explained at great length. If required, an additive and a binder are mixed with the raw material ferric oxide. Then, the mixture is granulated, dried, and formed into a given shape. After this, the thus formed body is held for firing at about 950 to 1,500° C., preferably about 1,050 to 1,300° C. for about 5 minutes to 5 hours, especially about 1 to 3 hours preferably in an atmospheric environment. At this time, the heating rate is preferably 100 to 300° C./h.

The raw material or ferric oxide powder may be a powder in which the contents of impurities with respect to $\alpha$-$Fe_2O_3$ lie in the ranges mentioned above, and a commercially available powder may be sufficiently used to this end. The raw material has an average particle size lying within a range of preferably 0.2 to 3 μm, more preferably 0.2 to 1.37 μm. Particle size may be measured by subsieve sizing or the like. When the raw material is in an aspheric form, the average particle size may be determined by observing the raw material particles under a scanning electron microscope (SEM) or the like, and finding the ratio of their length and breadth. The raw material has a specific surface area (BET) lying within a range of preferably 1 to 10 m$^2$/g, more preferably 3 to 4 m$^2$/g. For the raw material ferric oxide, $\alpha$-$Fe_2O_3$ is usually used. The raw material may contain, in addition to $\alpha$-$Fe_2O_3$, $Fe^{2+}$-containing iron oxides, for instance, $Fe_3O_4$, FeO, or $\gamma$-$Fe_2O_3$. In this case, no problem arises at all, because they change usually to $\alpha$-$Fe_2O_3$ after firing. The contents of these iron oxides are not critical if $Fe^{2+}$ is allowed to exist in the aforesaid quantitative range after firing. Besides, the raw material may contain impurity components provided that the final product is included in the aforesaid composition range. Available for the ferric oxide used herein are, for instance, HP500 made by Tone Sangyo K.K., PF3400 made by Toda Kogyo K.K., CSR800, and CSS410E made by Chemilight K.K., NK-α made by NKK Corporation, and KH-DSF made by Kawasaki Steel Corporation.

A binder added to the raw material during granulation may be one generally used so far for the granulation of ferrites, etc. Although not critical, it is preferable to use PVA (polyvinyl alcohol), and PEG (polyethylene glycol), for instance. Forming may be carried out using water without recourse to the binder. For means for kneading the raw material powders with the binder, on which no special limitation is imposed, mixers, and agitators such as press kneaders may be used. After mixing, the mixture is granulated into granules. No particular limitation is placed on how to granulate the mixture; granulation may be carried out in ordinarily used manners. However, granulation may be easily achieved by the extrusion of the mixture through a wire gauze or the like that has an opening size equal to a desired granule size. Alternatively, the raw material powders may be slurried, and the resulting slurry may then be granulated with the addition of the binder thereto by spray drying using a spray dryer. It is usually preferable that the obtained granules have an average particle size of about 10 µm to 1 mm, although varying dependent on the shape of the formed body, etc. Molding pressure is usually about 0.3 to 5 ton/cm², although not limited thereto.

No particular limitation is placed on coil shape, and so the present invention is applicable, with no difficulty, to the production of ordinarily used various forms of cores, for instance, so-called toroidal, I, EE, EI, ER, EPC, drum, pot, and cup forms of cores.

If required, a wire material formed of any one of Au, Ag, Cu, Fe, Pt, Sn, Ni, Pb, and Co, or an alloy thereof is wound on the core to obtain an inductance element. In this case, the wire material can be wound directly on the core with no insulating material between them, because the core has high-enough specific resistance.

EXAMPLE

The present invention will then be explained more specifically with reference to examples.

Example 1

Commercially available ferric oxide powders were provided as the raw material powders. Ten (10) wt % of a 3% aqueous solution of PVA 124 (made by Kuraray Co., Ltd.) was added as a binder to the powders, which were then kneaded, and granulated. The obtained granules were formed into a given shape conforming to the following measuring conditions, and held at 1,100° C. for 2 hours in an atmospheric environment for firing, thereby obtaining a sample No. 1 according to the invention. For the purpose of comparison, sample Nos. 2 and 3 were made of Ni-based spinel ferrite and alumina, respectively.

Each of the obtained samples was measured, and estimated for specific resistance, and Vickers hardness, respectively. Also, the Q value of each sample as formed into a coil was measured at 100, 200, 500, and 700 MHz.

Specific Resistance

Specific resistance was determined by forming an In-Ga (indium-gallium) electrode on an end surface of a disc sample of 1 inch in diameter and 5 mm in thickness, and measuring a resistance value at an applied voltage of 100 V by means of an IR meter (SUPER MEGOHM METER Model SM-5E made by TOA).

Flexural Strength

Flexural strength was determined according to the flexural strength test method (R1601) for fine ceramics prescribed by the JIS standard. Specifically, a sample formed into the prescribed size (about 38 mm in length, about 4 mm in width, and about 3 mm in thickness) was subject to three-point bending at a crosshead speed of 0.5 mm/min. under load to measure breaking load.

Vickers Hardness

Vickers hardness was measured using a microhardness meter (Shimadzu Microhardness Meter HMV-2000 Type made by Shimadzu Corporation) corresponding to a Vickers hardness tester according to JIS B7725 while a sample was held for 5 seconds under a load of 100 g according to JIS C2141.

Q Value

Figure 2:
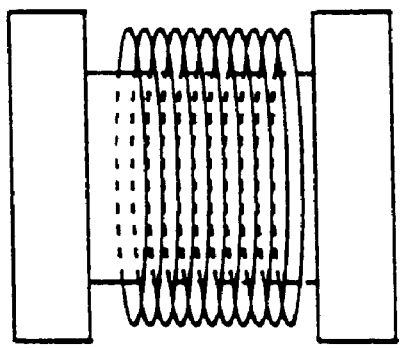
FIG. 2 illustrates an external shape of the core used for measuring Q values, with (a) being a front schematic thereof, and (b) being a side schematic thereof.
Figure 2:
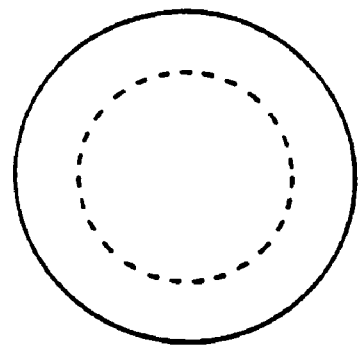

For measuring Q value, a sample was formed into a drum type core (which was not subject to any insulating treatment with resin) having a collar of 1.4 mm in diameter and 0.4 mm in height, and a drum body of 1.0 mm in diameter and 0.7 mm in height, as depicted in FIG. 2, and a wire material 3 was wound on the sample in 10 multiturns to make a coil 1. The Q value of coil 1 was then measured using an impedance analyzer (HP-4291A made by Hewlett-Packard Co.). FIG. 2(a), and 2(b) are front, and side schematics of coil 1, respectively.

The obtained results are shown in Table 1. Note that, for instance, "$10^9$" in this table represents a value between about $1 \times 10^9$ and about $9 \times 10^9$.

TABLE 1

| Sample No. | Raw Material | Flexural Strength (kgf/mm²) | Vickers Hardness | Specific Resistance (Ω · cm) | Q value 100 MHz | 200 MHz | 500 MHz | 700 MHz |
|---|---|---|---|---|---|---|---|---|
| 1 | $Fe_2O_3$ | 12 | 1200 | $10^9$ | 35 | 47 | 52 | 41 |
| 2 | Ni-based Ferrite | 9 | 800 | $10^8$ | 35 | 42 | 31 | 10 |
| 3 | $Al_2O_3$ | 30 | 2000 | $10^{11}$ | 35 | 45 | 54 | 45 |

As can be seen from Table 1, sample No. 1 according to the present invention is equivalent to, or higher than, the Ni-based spinel ferrite sample in terms of all properties. In terms of Vickers hardness, sample No. 1 is reduced by about half as compared with the alumina sample, indicating that it causes little, if any, damage to equipment. In terms of flexural strength and specific resistance, on the other hand, sample No. 1 is lower than the alumina sample, but equivalent to the Ni-based spinel ferrite sample. Thus, sample No. 1 has practically acceptable values.

Example 2

Sample Nos. 11 to 19 were obtained following Example 1 with the exception that commercially available ferric oxide powders a to i were used as the raw material, and 10 wt % of a 3% aqueous solution of PVA 124 was added thereto as the binder, as shown in Table 2. For the purpose of comparison, Ni-based spinel ferrite sample No. 21, and alumina sample No. 22 were prepared, respectively.

Each of the obtained samples was estimated as in Example 1. For the purpose of measuring Q values, however, a coil sample was prepared by winding a wire material on a toroidal core in three multiturns, said toroidal core being of 20 mm in outer diameter, 11 mm in inner diameter, and 4 mm in thickness. The results are set out in Table 2. Quantitative analysis of samples Nos. 11 to 19 for Mg, Al, Si, P, Ca, Cr, Mn, and Co yielded such results as shown in Table 3. Note that the amount of Fe was 99.1 to 99.2 wt %, calculated as $Fe_2O_3$.

TABLE 2

| Sample No. | Raw Material | Flexural Strength (kgf/mm$^2$) | Vickers Hardness | Specific Resistance ($\Omega \cdot$ cm) | Q value 100 MHz | 200 MHz | 500 MHz |
|---|---|---|---|---|---|---|---|
| 11 | a | 12 | 1430 | $10^9$ | 110 | 121 | 17 |
| 12 | b | 11 | 1262 | $10^{10}$ | 137 | 150 | 13 |
| 13 | c | 9 | 1022 | $10^9$ | 137 | 153 | 19 |
| 14 | d | 10 | 1145 | $10^9$ | 130 | 147 | 18 |
| 15 | e | 11 | 1208 | $10^{10}$ | 128 | 145 | 17 |
| 16 | f | 9 | 1087 | $10^{10}$ | 132 | 148 | 14 |
| 17 | g | 10 | 1188 | $10^{10}$ | 125 | 146 | 15 |
| 18 | h | 9 | 1054 | $10^9$ | 118 | 126 | 18 |
| 19 | i | 11 | 1257 | $10^9$ | 120 | 145 | 13 |
| 21 | $Al_2O_3$ | 30 | 2044 | $10^{11}$ | 134 | 146 | 17 |
| 22 | Ni-based Ferrite | 9 | 812 | $10^7$ | 138 | 149 | 9 |

TABLE 3

| Sample No. | Content (ppm) Mg | Al | Si | P | Ca | Cr | Mn | Co |
|---|---|---|---|---|---|---|---|---|
| 11(a) | 220 | 830 | 80 | 194 | 300 | 460 | 2700 | 30 |
| 12(b) | 30 | 420 | 350 | 4 | 110 | 260 | 2630 | 30 |
| 13(c) | 20 | 100 | 140 | 24 | 110 | 50 | 2910 | 30 |
| 14(d) | 15 | 9 | 90 | 11 | 65 | 9 | 2070 | 22 |
| 15(e) | 14 | 252 | 101 | 119 | 56 | 217 | 2019 | 23 |
| 16(f) | 17 | 6 | 79 | 18 | 25 | 6 | 1293 | 51 |
| 17(g) | 8 | 5 | 64 | 14 | 38 | 9 | 355 | 7 |
| 18(h) | 20 | 450 | 110 | 158 | 80 | 370 | 2600 | 30 |
| 19(i) | 7 | 9 | 10 | 10 | 32 | 8 | 2 | 13 |

As can be seen from Tables 2 and 3, sample Nos. 11 to 19 containing different quantities of additives had practically sufficient electrical, and mechanical properties. It was also ascertained that no problem arises in connection with properties if the content of $Fe_2O_3$ is at least 75 wt %.

Example 3

Figure 3:
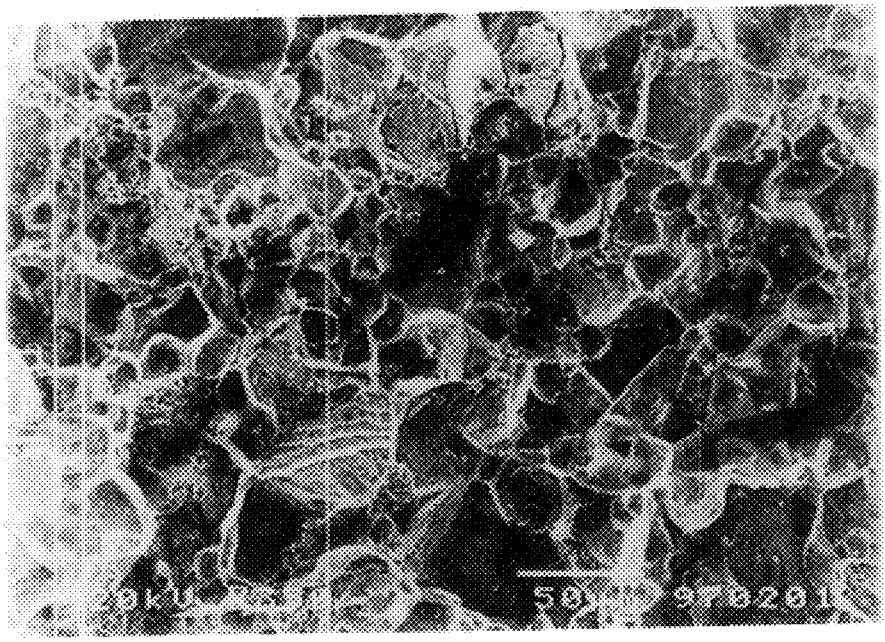
FIG. 3 is an SEM photograph that shows a fractured surface state of a core obtained by use of the core material for inductance elements according to the present invention.
Figure 4:
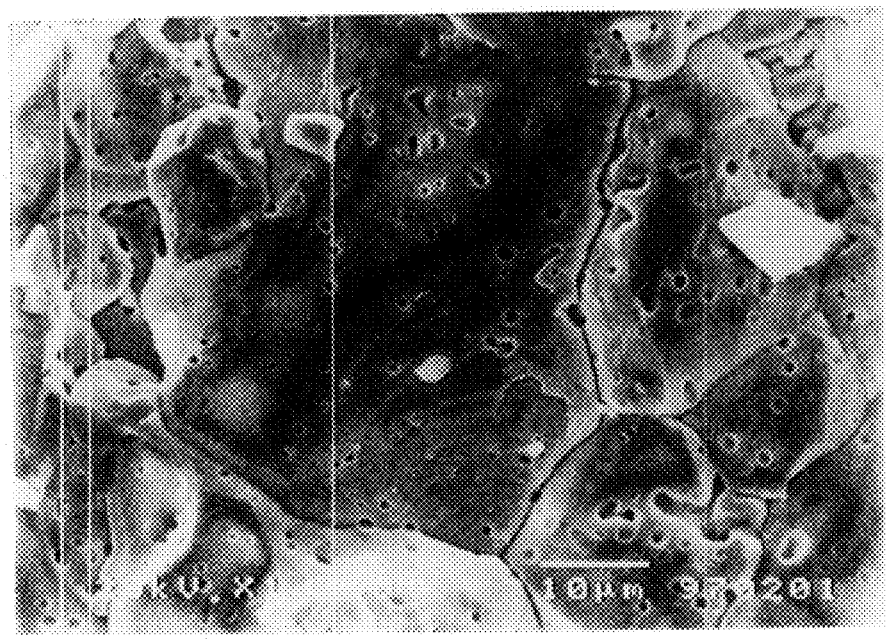
FIG. 4 is a magnified photograph of FIG. 3.

A core sample was obtained following Example 2 with the exception that sample No. 11 in Example 2 was fired at a firing temperature of 1,100° C. A fractured surface state of the obtained sample was observed under a scanning electron microscope (SEM). SEM photographs showing that state are attached-hereto as FIGS. 3 and 4.

Example 4

Figure 5:
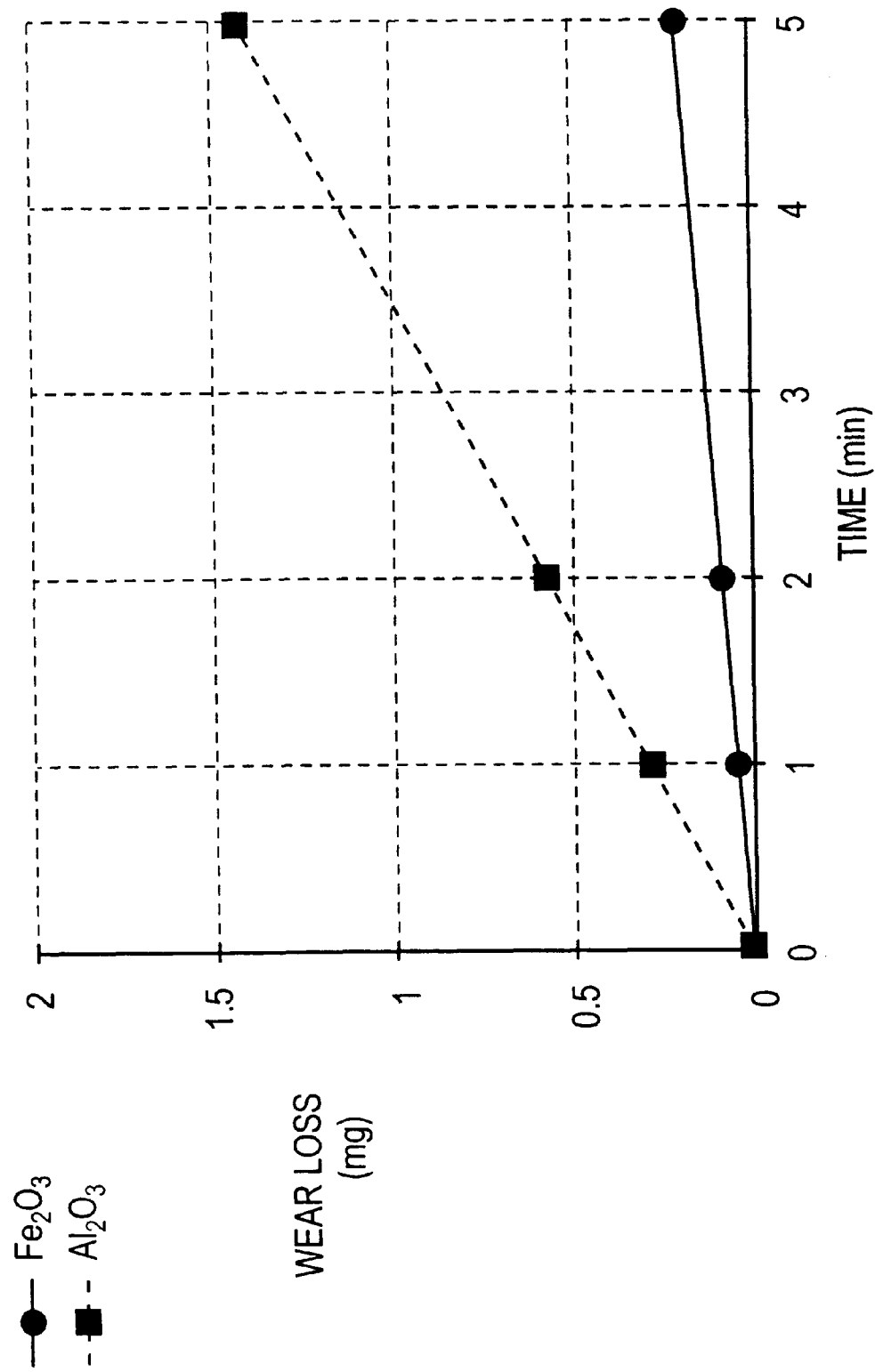
FIG. 5 is a graph that shows wear losses in mg/min. of a steel rod worn by a sample of the invention, and alumina.

Test pieces were prepared using the same materials as those of sample Nos. 1 and 3 in Example 1. Each of the obtained test pieces was rotated at 10,000 rpm for 0 to 5 minutes while a steel rod of 2.15 mm in diameter was pressed against it under a load of 1.5 kgf, thereby making estimation of to what degree the steel rod wore away. The results are shown in FIG. 5. Note that FIG. 5 is a graph showing wear losses of the rod in mg/min.

As can be seen from FIG. 5, the wear rate of the rod by the test piece according to the present invention was reduced to at most 1/10 of that by the alumina test piece. From this result, it is understood that the wear of core production equipment, for instance, molds, and chucks in packaging machines is much more reduced when producing the core of the present invention than when producing alumina cores, or the durability of the production equipment is much more improved than ever before.

According to the present invention, it is thus possible to provide a core material for inductance elements which has electrical properties equivalent to those achieved so far in the art, and practical-enough mechanical strength, and which can be produced at low cost through a more reduced number of steps than required to produce conventional materials, and causes little, if any, damage to production equipment, a core formed of the core material, and a core production method.

While the present invention has been described in connection with what is presently considered to be the most practical and preferred embodiment, it will be understood that the invention is not to be limited to the disclosed embodiment, but on the contrary, is intended to cover various modifications included within the spirit and scope of the invention.

We claim:

1. A core for an inductance element, which is a sintered body consisting essentially of α-ferric oxide.

2. The core for an inductance element of claim 1, which has a flexural strength of at least 6 kgf/mm$^2$ as measured by a three-point bending method.

3. The core for an inductance element of claim 1, which has a specific resistance of at least $10^6$ $\Omega \cdot$cm.

4. The core for an inductance element of claim 1, which has a Vickers hardness lying in a range of 800 to 1,500.

5. The core for an inductance element of claim 1, which has an iron content of 75 to 99.9 wt %, calculated as $Fe_2O_3$.

6. The core of claim 5, which has an iron content of 80–99.6 wt. %, calculated as $Fe_2O_3$.

7. The core for an inductance element of claim 1, in which the inductance element is a coil or transformer.

8. A method for producing the core for an inductance element of claim 1, which comprises granulating, and forming a ferric oxide powder, and holding a formed body for sintering at 950 to 1,500° C. for 5 minutes to 5 hours in an atmospheric environment.

9. The core of claim 1, wherein said core consists of said α-ferric oxide.

10. A method for producing a core for an inductance element, consisting essentially of:

sintering a formed body, to produce a core comprising α-ferric oxide;

wherein said formed body comprises a granulated raw material.

11. The method of claim 10, further comprising, prior to said sintering, forming said granulated raw material into said formed body;

wherein said granulated raw material comprises at least one iron oxide.

12. The method of claim 11, further comprising granulating a raw material to form said granulated raw material having an average granule size of 10 μm to 1 mm;

wherein said raw material has an average particle size of 0.2 to 3 μm.

13. The method of claim 10, wherein said sintering is carried out at 950–1500° C.

14. The method of claim 10, wherein said core consists of said α-ferric oxide.

15. The method of claim 10, wherein said core has an iron content of 75 to 99.9 wt. %, calculated as $Fe_2O_3$.

16. A product produced by the method of claim 10.

17. A product produced by the method of claim 10.

18. The method of claim 6 wherein said formed body comprises a binder.

19. An inductance element, consisting essentially of:

a core which is a sintered body comprising α-ferric oxide, and a wire wound on said core.

20. A method of making an inductance element, comprising:

forming a core by the method of claim 10, and winding a wire around said core.

* * * * *

UNITED STATES PATENT AND TRADEMARK OFFICE
CERTIFICATE OF CORRECTION

PATENT NO. : 5,966,065

DATED : October 12, 1999

INVENTOR(S): Masahiro ONIZUKA, et al.

It is certified that an error appears in the above-identified patent and that said Letters Patent is hereby corrected as shown below:

Column 12, line 11, "claim 6" should read --claim 10--.

Signed and Sealed this

Fourteenth Day of November, 2000

Attest:

Q. TODD DICKINSON

*Attesting Officer*   *Director of Patents and Trademarks*